United States Patent
Hirano et al.

(12) 
(10) Patent No.: US 10,640,027 B2
(45) Date of Patent: May 5, 2020

(54) TABLE UNIT

(71) Applicant: NIFCO INC., Kanagawa (JP)

(72) Inventors: Yoichi Hirano, Kanagawa (JP); Ryuji Tsunoda, Kanagawa (JP)

(73) Assignee: Nifco, Inc., Kanagawa (JP)

( * ) Notice: Subject to any disclaimer, the term of this patent is extended or adjusted under 35 U.S.C. 154(b) by 0 days.

(21) Appl. No.: 16/316,669

(22) PCT Filed: May 31, 2017

(86) PCT No.: PCT/JP2017/020256
§ 371 (c)(1),
(2) Date: Jan. 10, 2019

(87) PCT Pub. No.: WO2018/012134
PCT Pub. Date: Jan. 18, 2018

(65) Prior Publication Data
US 2019/0152373 A1    May 23, 2019

(30) Foreign Application Priority Data

Jul. 14, 2016 (JP) .................................. 2016-139606

(51) Int. Cl.
*B60N 3/00* (2006.01)
*B60N 3/10* (2006.01)
(Continued)

(52) U.S. Cl.
CPC ................ *B60N 3/004* (2013.01); *A47C 7/62* (2013.01); *B60N 3/102* (2013.01);
(Continued)

(58) Field of Classification Search
CPC .... B60N 3/004; B60N 3/102; B64D 11/0638; A47C 7/62; F16C 11/04; F16C 2326/08; F16C 2326/30; F16C 2326/43
(Continued)

(56) References Cited

U.S. PATENT DOCUMENTS

| 9,422,059 | B2 * | 8/2016 | Martinak | ............... | B60N 3/004 |
| 2010/0133857 | A1 * | 6/2010 | Kim | ....................... | B60N 3/004 |
| | | | | | 292/297 |

(Continued)

FOREIGN PATENT DOCUMENTS

| EP | 2206626 A1 | 7/2010 |
| JP | H06-124570 A | 5/1994 |

(Continued)

OTHER PUBLICATIONS

PCT IB Form 338, Notification of Transmittal of Translation of the International Preliminary Report on Patentability (Chapter I or Chapter II); The International Bureau of WIPO, Geneva, Switzerland, Jan. 24, 2019.

(Continued)

*Primary Examiner* — Mark R Wendell
(74) *Attorney, Agent, or Firm* — Hammer & Associates, P.C.

(57) ABSTRACT

Provided is a table unit enabling easy opening of a table provided to the back surface of a seat backrest. A table unit is provided with: a hinge mechanism that is coaxially fitted to a fulcrum shaft portion of a table main body and that can retain and release the table main body in and from a plurality of attitudes; and a hook unit that retains and releases the table main body at the position of a housed attitude. The hinge mechanism is configured to have a pair of cam bodies that face each other in the axial direction, and, through mutual cooperation of the pair of cam bodies, position the table main body to a use attitude in which the table main body is deployed to a use position and to a partially-housed attitude between the housed attitude and the use attitude as a plurality of stages of attitudes.

8 Claims, 7 Drawing Sheets

(51) Int. Cl.
*A47C 7/62* (2006.01)
*B64D 11/06* (2006.01)
*F16C 11/04* (2006.01)

(52) U.S. Cl.
CPC .......... *B64D 11/0638* (2014.12); *F16C 11/04* (2013.01); *F16C 2326/08* (2013.01); *F16C 2326/30* (2013.01); *F16C 2326/43* (2013.01)

(58) Field of Classification Search
USPC ........................................................ 297/163
See application file for complete search history.

(56) References Cited

U.S. PATENT DOCUMENTS

| 2015/0115668 A1 | 4/2015 | Martinak et al. |
| 2018/0111691 A1* | 4/2018 | Van Liere ................ A47B 5/02 |

FOREIGN PATENT DOCUMENTS

| JP | H09-211624 A | 8/1997 |
| JP | H10-92403 A | 4/1998 |
| JP | 2002-095546 A | 4/2002 |
| JP | 2015-509463 A | 3/2015 |
| JP | 5887434 | 3/2015 |

OTHER PUBLICATIONS

PCT IB Form 373, International Preliminary Report on Patentability, with translated Written Opinion of the International Searching Authority dated Jan. 15, 2019, The International Bureau of WIPO, Geneva, Switzerland.

* cited by examiner

TABLE UNIT

TECHNICAL FIELD

The present invention relates to a seat that is mounted on a transportation means, such as a vehicle, an airplane, a ship, and a train, and particularly relates to a table unit mounted to the backrest of a seat of this type.

BACKGROUND ART

As a table unit of this type, for example, a technology described in PTL 1 is disclosed. In the technology described in PTL 1, a table unit is mounted on the back surface side of the backrest of a seat for a vehicle. The table unit includes a table main body that a passenger manually opens and closes.

The table main body is configured to be able to rotate about a fulcrum axis extending in the vehicle width direction from a housed attitude in which the table main body is folded to the backrest side to a use attitude in which the folding is released. In addition, a hinge mechanism including cam bodies is disposed in a fulcrum shaft portion of the table main body, and the table main body is configured to be able to, by means of the hinge mechanism, rotate from the housed attitude to the use attitude and retain the respective attitudes.

CITATION LIST

Patent Literature

PTL 1: JP 5887434 B

SUMMARY OF INVENTION

Technical Problem

However, the table unit described in PTL 1 does not have a mechanism for releasing the table main body from a state of being retained in the housed attitude except the hinge mechanism including cam bodies. Therefore, a passenger is required to, while hooking his/her fingers on a recessed portion or the like of the table main body and opening the table main body from the housed attitude thereof against retention force produced by the cam bodies in the hinge mechanism, make the table main body overhang to the position of the use attitude with a relatively strong force. For this reason, it is difficult to perform opening operation of the table main body with a weak force, and there is also a possibility that, when a relatively strong force is applied to open the table main body, the table main body suddenly rotate with strength that the passenger has not expected.

Accordingly, the present invention has been made in view of such a problem, and a problem to be solved by the present invention is to provide a table unit that enables opening operation of a table main body to be easily performed.

Solution to Problem

In order to achieve the object mentioned above, according to an aspect of the present invention, there is provided a table unit including: a base panel disposed to a back surface of a backrest of a seat; a table main body mounted to the base panel via a fulcrum shaft portion and configured to be able to rotate toward a back side of the backrest from a housed attitude in which a table mounting-surface of the table main body is positioned along the base panel to a use attitude in which the table mounting-surface is distanced from the base panel; a housed attitude retaining unit configured to retain and release the table main body in and from the housed attitude; and a hinge mechanism configured to, disposed separately from the housed attitude retaining unit, form the fulcrum shaft portion and to be able to retain and release the table main body in and from a plurality of attitudes, wherein the hinge mechanism is configured to be able to retain the table main body in, as the plurality of attitudes of the table main body, the use attitude and a partially-housed attitude located on the way from the housed attitude to the use attitude.

The table unit according to the aspect of the present invention includes the housed attitude retaining unit configured to retain and release the table main body in and from the housed attitude, therefore, it is possible to retain the table main body in the housed attitude by the housed attitude retaining unit different from the hinge mechanism.

In addition, the table unit according to the aspect of the present invention includes the hinge mechanism forming the fulcrum shaft portion, and the hinge mechanism is configured to retain the table main body in the partially-housed attitude located on the way from the housed attitude to the use attitude. Therefore, when the passenger releases the retention by the housed attitude retaining unit, the table main body rotates to a partially-housed attitude short of the use attitude, and retained in this attitude.

Therefore, according to the table unit according to the one aspect of the present invention, even when the table main body is released from the housed attitude, the table main body is prevented from rotating to the use attitude too fast. Since, in the partially-housed attitude, the table main body is put in a state of, so to speak, half-open, it is possible to prompt a passenger to perform manual opening or closing. Thus, since the passenger can easily grasp the table main body that is in the state of half-open, the passenger can more easily perform opening and closing operation of the table main body while securely grasping the table main body when compared with performing opening operation by just hooking finger tips on the table main body. Therefore, according to the table unit according to the one aspect of the present invention, opening operation of the table main body can be easily performed.

According to the table unit according to the one aspect of the present invention, since the table unit has, so to speak, a dual housed attitude retaining structure by incorporating the hinge mechanism, which is capable of retaining the table main body in the partially-housed attitude, and the housed attitude retaining unit, which is capable of retaining the housed attitude, separately from the hinge mechanism, it is possible to prevent or suppress unexpected table opening at the time of vehicle collision.

Further, according to the table unit according to the one aspect of the present invention, since the hinge mechanism disposed to the fulcrum shaft portion enables the table main body to be retained in the partially-housed attitude, it is possible to reduce fixing force required for the housed attitude retaining unit in the housed attitude. Since this capability enables opening force required for positioning the table main body to the use attitude to be set lower than a table unit having a single housed attitude retaining structure, the table unit excels in facilitating opening operation of the table main body.

Advantageous Effects of Invention

As described above, the present invention enables a table unit to be provided in which opening operation of a table is easily performed.

BRIEF DESCRIPTION OF DRAWINGS

FIGS. 1A and 1B illustrate a use attitude in which a table main body is opened and a state in which, in the use attitude in FIG. 1A, a hinge mechanism portion is exploded, respectively;

FIG. 5 illustrates a cross section taken along the line Z-Z in FIG. 1A;

DESCRIPTION OF EMBODIMENTS

Hereinafter, an embodiment of the present invention will be described with reference to the drawings as appropriate. A table unit of the present embodiment is a table unit mounted on the back surface of the backrest of a seat for a vehicle.

Note that the drawings are schematic. Therefore, it should be noted that a relation and ratio between thickness and planar dimensions, and the like are different from actual ones, and portions where dimensional relations and ratios are different from one another among the drawings are also included. In addition, the embodiment, which will be described below, indicates a device and method to embody a technical idea of the present invention, and the technical idea of the present invention does not limit materials, shapes, structures, arrangements, and the like of the constituent components to those described in the embodiment below.

Figure 1A:
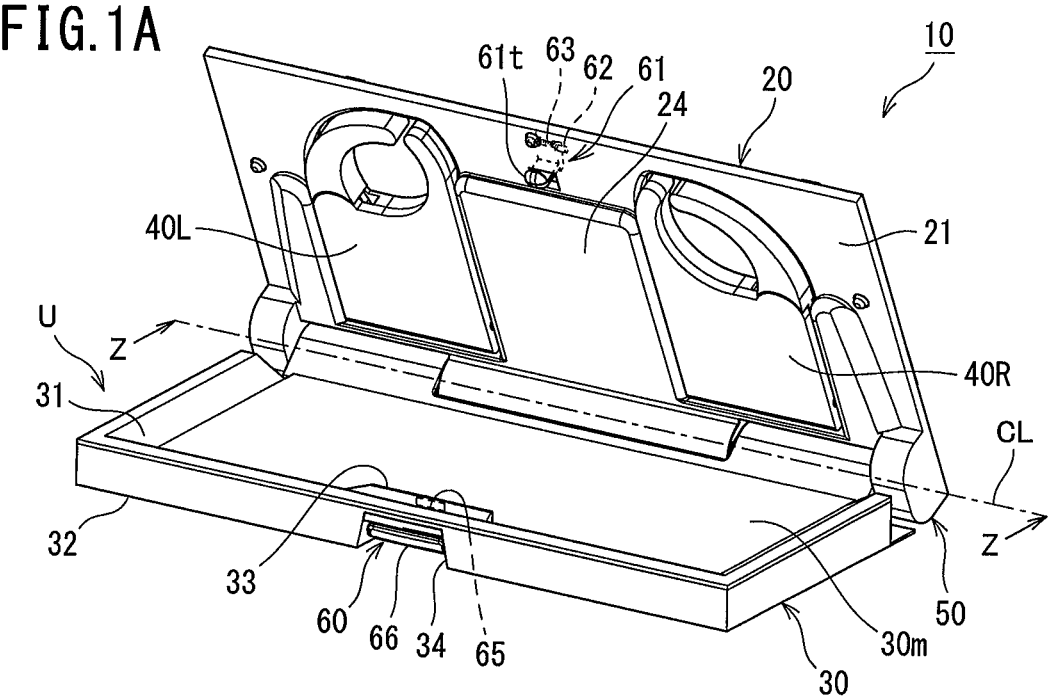
FIGS. 1A to 1B are perspective views descriptive of an embodiment of a table unit according to one aspect of the present invention.
Figure 1B:
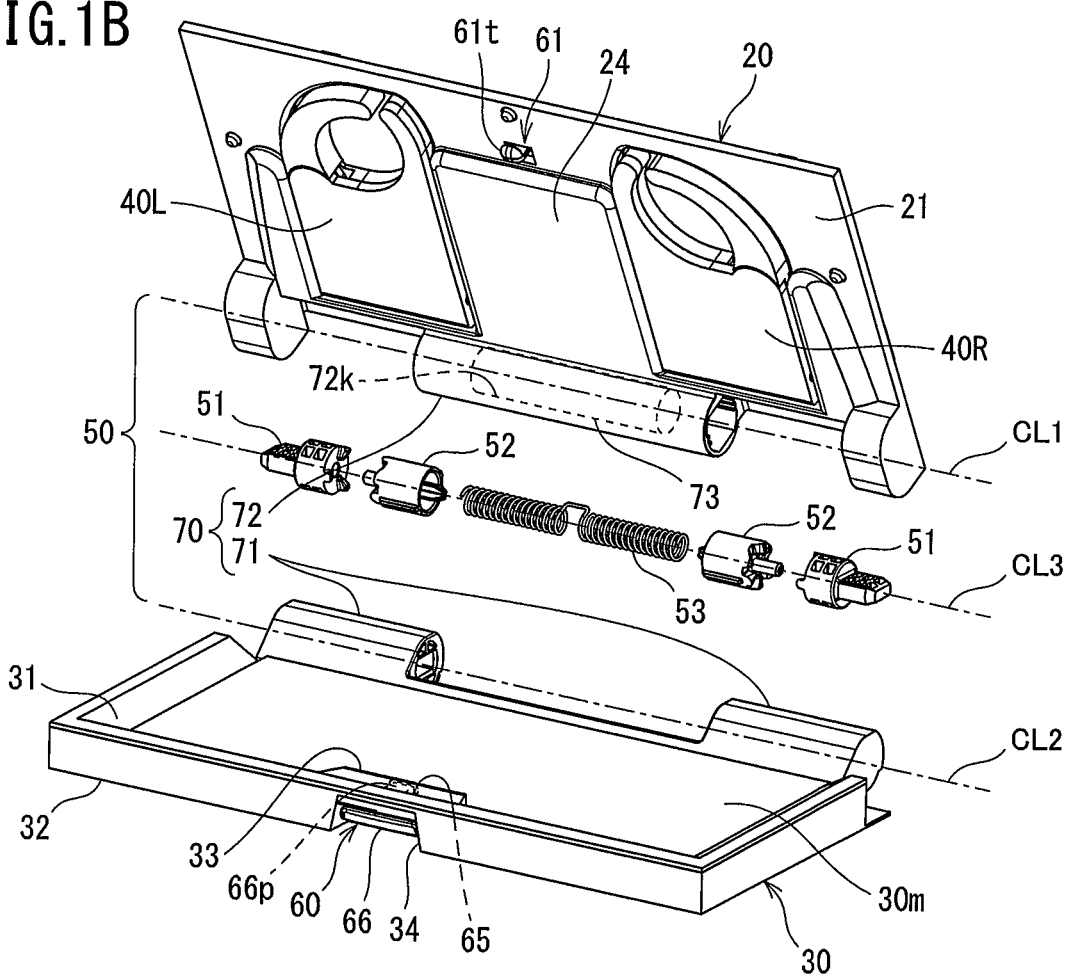

As illustrated in FIGS. 1A to 1C, a table unit 10 of the present embodiment includes a base panel 20 and a table main body 30. On a lower portion of the base panel 20, a hinge mechanism 50 that has a fulcrum axis CL extending horizontally in the vehicle width direction is disposed as a fulcrum shaft portion.

The base panel 20 is a member that is made of plastic and is formed in a substantially rectangular shape in a plan view. On the rear surface of the base panel 20, a lattice-shaped reinforcing rib (not illustrated) and a locking portion (not illustrated) for holding the base panel 20 to a backrest are formed. On the back surface of a not-illustrated backrest, a backrest finisher that is made of, for example, plastic is mounted, and the base panel 20 has appropriate portions thereof fixed to the backrest finisher by fixing members, such as bolts and clamps, in such a way as to cover a recessed portion on an upper portion side of the backrest finisher.

The table main body 30 is a member that is made of plastic and is formed in a substantially similar shape to the external shape of the base panel 20 in a plan view. The table main body 30 has a base end portion thereof rotatably supported about the fulcrum axis CL on a lower end portion of the base panel 20 and, at normal times, is rotatable from a housed attitude H (FIG. 2A) to a use attitude U (FIG. 2C) illustrated in FIGS. 2A to 2D.

Figure 2A:
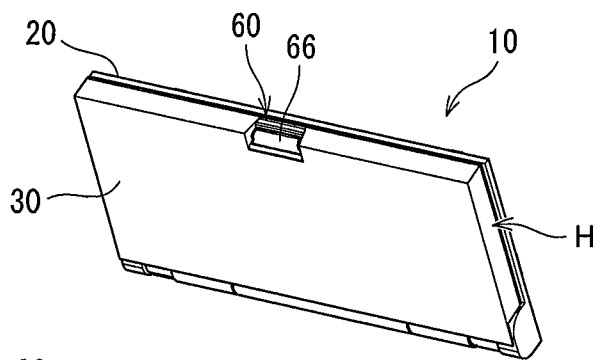
FIGS. 2A to 2D are perspective views descriptive of a plurality of attitudes that the table main body may take in the table unit illustrated in FIGS. 1A to 1C, and FIGS. 2A to 2D illustrate a housed attitude, a partially-housed attitude, the use attitude, and a spread-out attitude, respectively.

In the present embodiment, in the use attitude U illustrated in FIG. 1A, the table main body 30 rotates to a predetermined angle from a front surface 21 of the base panel 20 and is deployed to a position at which a table mounting-surface 30m of the table main body 30 is substantially horizontal. In addition, as illustrated in FIG. 2A, in the housed attitude H, the table main body 30 is housed to a position at which the table mounting-surface 30m of the table main body 30 is positioned along the base panel 20.

Although the table main body 30 is set to have the table mounting-surface 30m positioned substantially horizontal in the use attitude U when the backrest of the seat for the vehicle is in a state of being arranged to a regular stand-up position, at which the backrest slightly inclines backward, a backrest generally has its inclination attitude adjustable by means of a reclining mechanism, as a result of which a horizontal state of the table main body 30 in the use attitude U varies according to a reclining angle.

On the front surface 21 of the base panel 20, two cup holders 40L and 40R are disposed in a horizontally symmetrical manner, as illustrated in FIGS. 1A to 1C. Each of the cup holders 40L and 40R has not-illustrated fulcrum shafts disposed coaxially at the right and left ends of a base end portion thereof and is supported rotatably about the fulcrum shafts.

When the table main body 30 is in the use attitude U, each of the cup holders 40L and 40R is rotated about the fulcrum shafts to a position at which the cup holder is substantially parallel with the table mounting-surface 30m of the table main body 30 and serves a role of supporting a cup or similar article, such as a paper cup, a canned juice, and a beverage container.

Between the two cup holders 40L and 40R, a rectangular-shaped center cover 24 is mounted in such a way as to cover a portion including the fulcrum shafts on the middle sides between the respective cup holders 40L and 40R. The center cover 24 causes a central portion of the base panel 20 to be kept in a good external appearance.

When the table main body 30 is in the housed attitude H described above, in which the table main body 30 is closed to the side where the base panel 20 is located, the base panel 20 and the table main body 30 are hooked to each other by a hook unit 60, which has an engagement structure that is disposed on both members, as a result of which the housed attitude H is retained. In other words, the hook unit 60 corresponds to a "housed attitude retaining unit" described in the solution to problem.

As illustrated in FIGS. 1A to 1C, the hook unit 60, as the engagement structure described above, includes a hook main body 61 that is disposed at the middle of an upper edge portion of the base panel 20 and an engagement hole 65 that is disposed at the middle of an upper edge portion of the table main body 30. The hook main body 61 is rotatably supported about a fulcrum shaft 62 disposed on a base end portion of the hook main body 61 and is biased in the direction in which a claw 61t disposed at the tip of the hook main body 61 engages with the engagement hole 65 by a biasing force of a cylindrical coil spring 63 arranged on the base end portion of the hook main body 61. The engagement hole 65 is disposed at a position at which the engagement hole 65 faces the hook main body 61 in an engageable manner when the table main body 30 is at the position of the housed attitude H.

The table main body 30 includes a front side panel 31 on which the table mounting-surface 30m is disposed and a rear side panel 32. On each of surfaces of the respective panels 31 and 32 that face each other, a lattice-shaped reinforcing rib (not illustrated) is formed. The rear side panel 32 is mounted from the reverse surface side of the front side panel 31 in such a way as to cover the surface opposite to the table mounting-surface 30m. The table main body 30 has, on a portion at the middle of an upper edge portion thereof where the engagement hole 65 is formed, a bulging portion 33 formed that respectively bulges toward the front and rear sides of the table main body 30. The bulging portion 33 has a substantially rectangular opening portion 34 formed on an upper portion of the rear side panel 32.

Inside the bulging portion 33, a push button 66 that is arranged in such a way as to face the opening portion 34 from the inside and a not-illustrated biasing spring for biasing the push button 66 are arranged. The biasing spring biases the push button 66 toward the side where the opening portion 34 on the upper portion is formed, which is the opposite side to the direction in which the push button 66 is pushed down. The push button 66 serves as an operation portion on which a passenger manually performs a push-down operation to release engagement of the hook main body 61. The push button 66 is positioned at the middle of an upper portion of the table main body 30 in the housed attitude H. The push button 66 has, on a center lower portion thereof, a hook pushing-down protruding portion 66p protruding at a position at which the hook pushing-down protruding portion 66p faces the claw 61t of the hook main body 61 when the table main body 30 is in the housed attitude H, in such a manner as to be able to push down the claw 61t, as illustrated in FIG. 1B.

This configuration enables the hook unit 60 to, when the table main body 30 is in the housed attitude H, retain the table main body 30 in a state in which rotational motion thereof is restricted by elastically hooking the claw 61t of the hook main body 61 to the engagement hole 65. In addition, the hook unit 60 is configured in such a way that, when the passenger pushes down the push button 66, the hook pushing-down protruding portion 66p pushes down the claw 61t of the hook main body 61 and releases the claw 61t from a state of being hooked to the engagement hole 65, which enables the engagement in the hook unit 60 to be released.

Further, in the present embodiment, the table main body 30 is supported by the hinge mechanism 50, which connects the table main body 30 to the base panel 20, in a manner enabling the table main body 30 to be rotated and to be retained and released in and from a plurality of attitudes with respect to the base panel 20.

The hinge mechanism 50 includes, as constituent members thereof, two pairs of cam bodies each of which includes a first cam body 51 and a second cam body 52 that pair with each other and a coil spring 53, as illustrated in an exploded perspective view in FIG. 1B. The pairs of the first cam body 51 and the second cam body 52 are arranged in an opposite manner to each other at horizontally symmetrical positions on both sides in the axial direction in a state of being biased to the outsides in the axial direction by the coil spring 53 arranged at the middle. The constituent members of the hinge mechanism 50 are built into a hinge case 70 the constituent components of which are respectively formed in one body with the base panel 20 and the table main body 30.

The hinge mechanism 50 is configured in such a way that, when the passenger manually rotates the table main body 30 relatively to the base panel 20, each first cam body 51 and the paired second cam body 52 rotate relatively to each other to a predetermined angle by a biasing force of the coil spring 53 and through a camming action between the first cam body 51 and the second cam body 52 and, therewith, the cam surfaces of both the cam bodies 51 and 52 come into a predetermined state of engagement with each other at a position corresponding to the predetermined angle, as a result of which the table main body 30 can be retained in an attitude in which the table main body 30 rotates relatively to the base panel 20 by the predetermined angle.

Figure 4:
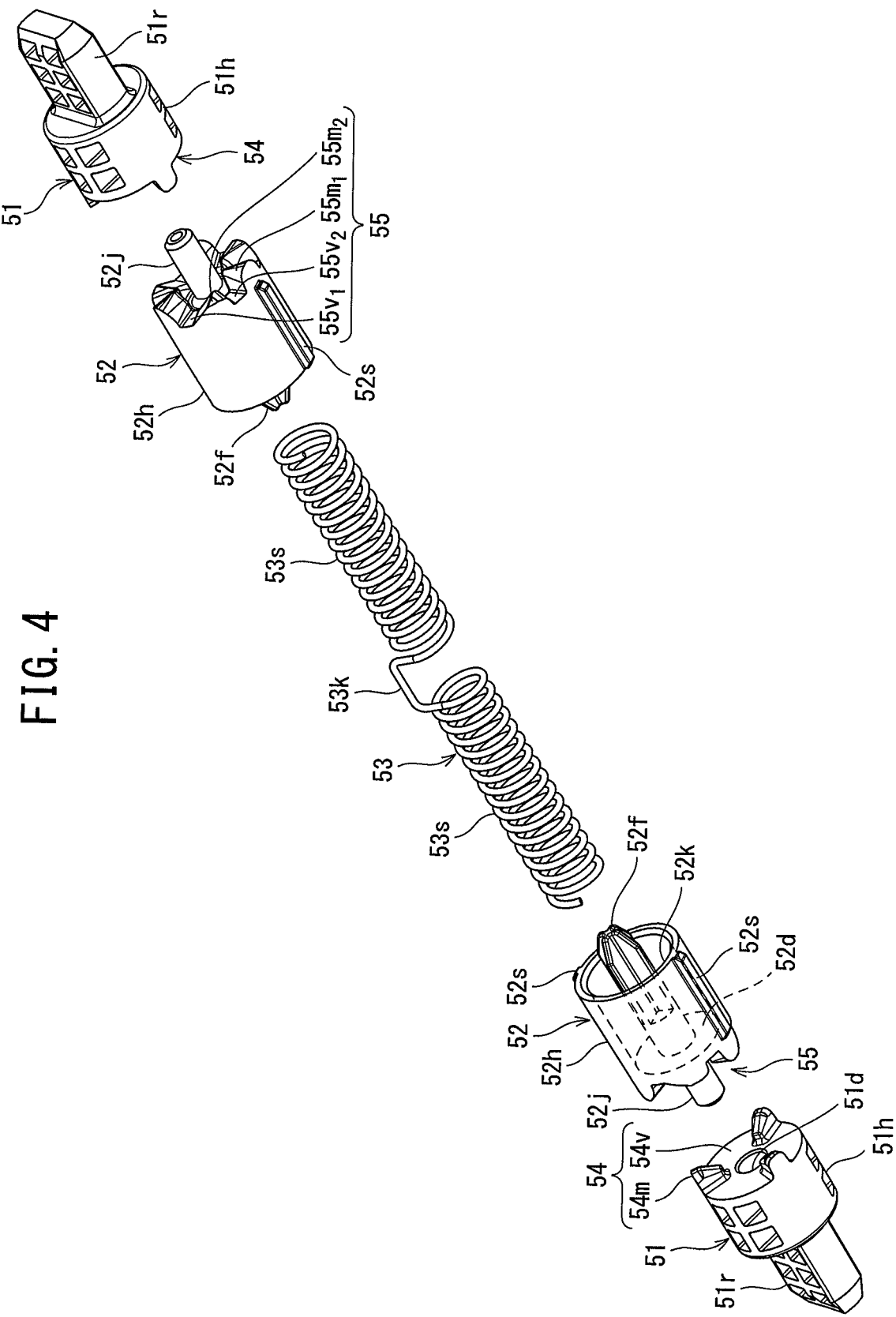
FIG. 4 is an enlarged view descriptive of the hinge mechanism illustrated in FIG. 1B.

Specifically, each first cam body 51 is a member made of plastic and, as illustrated in an enlarged manner in FIG. 4, includes, in one body, a cylindrical main body portion 51h and a cuboid-shaped connection portion 51r that is disposed in a protruding manner along the axial direction on one end surface of the main body portion 51h. The connection portion 51r has, on a side surface thereof, a positioning groove (not illustrated) for use in installation formed along the axial direction. The main body portion 51h has, on the other end surface thereof, a cam surface 54 formed in one body.

The cam surface 54 of each first cam body 51 is formed into a concavo-convex shape in which three mountain portions 54m and three valley portions 54v, alternately arranged at equal intervals along the circumferential direction, string in a ring shape. The main body portion 51h of each first cam body 51 has a closed-end mounting hole 51d formed along the axial direction at the center of the cam surface 54. Each first cam body 51 has a plurality of rectangular groove-shaped recesses formed at appropriate locations on the outer surface, which has improved formability of the first cam body 51.

Each second cam body 52 is a member made of plastic and, as illustrated in FIG. 4, includes a cylindrical main body portion 52h. The main body portion 52h of each second cam body 52 has, on the outer peripheral surface thereof, two splines 52s formed along the axial direction at positions separated from each other in the circumferential direction by 180°. The main body portion 52h of each second cam body 52 has, on one end surface thereof, a cam surface 55 formed in one body. The cam surface 55 of each second cam body 52 is formed into a concavo-convex shape in which in total six mountain portions $55m_1$ and $55m_2$ and in total six valley portions 55$v_1$ and 55$v_2$, alternately arranged at equal intervals along the circumferential direction, string in a ring shape.

Each second cam body 52 has, at the center of the cam surface 55, a shaft portion 52$j$ formed that is coaxially insertable into the mounting hole 51$d$ of the paired first cam body 51 with a slight gap therebetween. Each second cam body 52 has a recessed opening portion 52$k$ formed in a hollow cylindrical shape at the center of the other end surface of the main body portion 52$h$. The recessed opening portion 52$k$ has, at the center of a bottom surface 52$d$ thereof, a support shaft 52$f$ formed in one body that projects along the axial direction from the center of the bottom surface 52$d$ to the middle side of the hinge case 70.

The coil spring 53 is a biasing means that is arranged between the two pairs of the cam bodies 51 and 52 described above and respectively provides biasing forces to the two pairs of the cam bodies 51 and 52 in the axial directions. As illustrated in FIG. 4, the coil spring 53 is formed from one wire for spring and includes a substantially U-shaped hooking portion 53$k$ that is formed at the middle and spring portions 53$s$ that are made up of two cylindrical coil springs formed on the right and left of the hooking portion 53$k$. The axis of the right and left spring portions 53$s$ is formed at a position at which the axis becomes coaxial with the fulcrum axis CL described above when the coil spring 53 is built into the hinge case 70.

The hinge case 70 is made up of table side hinge cases 71 that are formed in one body with the table main body 30 and a base side hinge case 72 that is formed in one body with the base panel 20, as illustrated in FIG. 1B. In the present embodiment, the table main body 30 has two cylindrically shaped table side hinge cases 71 formed in one body at positions on the right and left sides of a lower portion thereof. The base panel 20 has a hollow cylindrically shaped base side hinge case 72 formed in one body at a position at the middle of a lower portion thereof.

Figure 5:
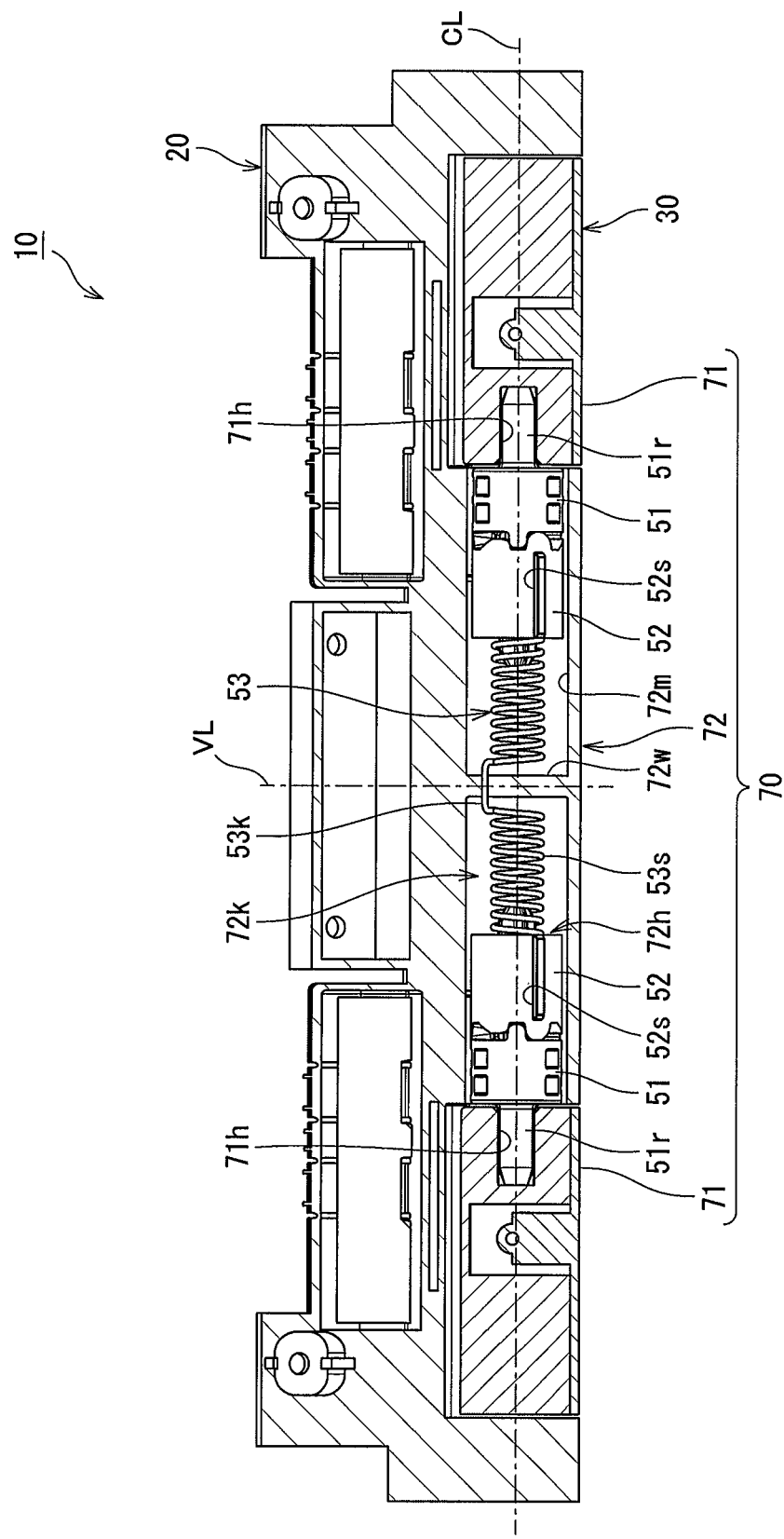
FIG. 5 is an explanatory diagram of the hinge mechanism.

As a cross section of a main portion is illustrated in an enlarged manner in FIG. 5, the base side hinge case 72 has a cylinder portion 72$h$ the inner peripheral surface of which is formed in a hollow shape. The cylinder portion 72$h$ is formed in a penetrating manner coaxially with the fulcrum axis CL of the table unit 10. The cylinder portion 72$h$ has, on an inner peripheral surface 72$m$ thereof, two spline grooves (not illustrated) formed along the axial direction. The two spline grooves are formed in such a way as to be respectively fitted to the two splines 52$s$ of each second cam body 52 described above and to enable the second cam bodies 52 to be slidingly guided along the axial direction.

In the present embodiment, the two spline grooves are formed at positions separated from each other in the circumferential direction by 180°. In the present embodiment, each of the two splines 52$s$ and the two spline grooves are configured in such a way that one is wider than the other. This configuration causes the base side hinge case 72 and the second cam bodies 52 to be configured in such a way that the second cam bodies 52 are insertable into the base side hinge case 72 only at a preset insertion position.

Further, the base side hinge case 72 has, at a middle position on the rear surface side of the base panel 20, an opening portion 72$k$ formed that opens a middle portion of the cylinder portion 72$h$ described above (see FIG. 1B). The opening portion 72$k$ opens substantially a rear side half in the circumferential direction of a middle portion of the cylinder portion 72$h$, leaving both end sides closed. To the opening portion 72$k$, a hinge case cover 73 that covers the opening portion 72$k$ is mounted in a detachable manner.

The cylinder portion 72$h$ has, on a portion of the inner peripheral surface 72$m$ facing the opening portion 72$k$, a middle wall surface 72$w$ formed at a position VL partitioning the cylinder portion 72$h$ in a horizontally symmetrical manner. The middle wall surface 72$w$ is formed in a standing manner in the direction toward the opening portion 72$k$ to a position equivalent to substantially a half of the diameter of the cylinder portion 72$h$ and serves as a "spring hooking protrusion" on which the hooking portion 53$k$ at the middle of the coil spring 53 can be hooked.

As illustrated in FIG. 5, the two table side hinge cases 71 on both sides of a base end portion of the table main body 30 are disposed in such a way as to sandwich the base side hinge case 72 positioned at the middle from both end sides of the base side hinge case 72. The central axes of the table side hinge cases 71 are also aligned with the fulcrum axis CL of the table unit 10. The table side hinge cases 71 on the right and left sides are arranged in such a way that the inner end surfaces thereof come into sliding contact with the outer end surfaces of the cylinder portion 72$h$ of the base side hinge case 72. Each of the two table side hinge cases 71 has the end surface thereof on the outer edge side of the table main body 30 closed and therewith has a rectangular cylindrical insertion hole 71$h$ formed on the other end surface thereof. Each insertion hole 71$h$ opens at a predetermined position in such a way that the cuboid-shaped connection portion 51$r$ of the corresponding first cam body 51 is inserted thereinto and thereby supported.

As illustrated in FIG. 5, in the hinge case 70, from the opening portion 72$k$ on the rear surface of the base side hinge case 72, the first cam bodies 51, the second cam bodies 52, and the coil spring 53 are placed and mounted inside the cylinder portion 72$h$ in this sequence toward the sides where the rectangular cylindrical insertion holes 71$h$ of the table side hinge cases 71 are formed.

As a mounting procedure, first, the connection portions 51$r$ of the first cam bodies 51 are respectively inserted, at a predetermined angle, into the rectangular cylindrical insertion holes 71$h$ of the table side hinge cases 71 on the right and left sides. Next, the second cam bodies 52 are inserted into the cylinder portion 72$h$ from the opening portion 72$k$, and each second cam body 52 is held to the paired first cam body 51 in such a way that the cam surfaces of respective cam bodies are disposed at a predetermined position to face each other.

Next, the tips of the respective spring portions 53$s$ on both sides of the coil spring 53 are inserted into the recessed opening portions 52$k$ of the second cam bodies 52, and the whole body of the coil spring 53, with the spring portions 53$s$ respectively compressed to a shortened state, is inserted between the second cam bodies 52 on the right and left sides in the cylinder portion 72$h$ of the base side hinge case 72 from the opening portion 72$k$. Subsequently, with the coil spring 53 pushed into the cylinder portion 72$h$, the hooking portion 53$k$ at the middle of the coil spring 53 is hooked on the middle wall surface 72$w$.

Subsequently, as illustrated in FIG. 1B, the hinge case cover 73 is mounted to the opening portion 72$k$ of the base side hinge case 72 from the rear surface side, and the opening portion 72$k$ is thereby closed. The operation in accordance with the procedure causes the respective constituent members of the hinge mechanism 50 to be built into the hinge case 70 coaxially.

In other words, an axis CL1 of the base side hinge case 72, an axis CL2 of the table side hinge case, and an axis CL3 of the built-in constituent members, illustrated in FIG. 1B, are arranged coaxially with the fulcrum axis CL illustrated in FIG. 1A, and the hinge mechanism 50 including the first cam bodies 51, the second cam bodies 52, the coil spring 53, and the hinge case 70 is constituted at both ends of the fulcrum shaft portion of the table main body 30. As described above, the table unit 10 enables connection operation of the table main body 30 and the base panel 20 to be performed with high operation efficiency through an easy operation of only setting the respective constituent members in the hinge case 70 of the hinge mechanism 50 in sequence.

In this mounting state, since, as illustrated in FIG. 5, the cuboid-shaped connection portion 51r of each first cam body 51 is contained in the rectangular cylindrical insertion holes 71h of the corresponding table side hinge case 71, the first cam body 51 is supported integrally with the table side hinge case 71 in a non-rotatable state. The cylindrical main body portion 51h of each first cam body 51 is disposed in a state of projecting in the cylinder portion 72h of the base side hinge case 72. The outer peripheral surface of the main body portion 51h of each first cam body 51 is in sliding contact with the cylinder portion 72h of the base side hinge case 72 in a rotatable state in the cylinder portion 72h.

On the other hand, since each second cam body 52 has the two splines 52s thereof respectively engaged with the two spline grooves of the base side hinge case 72 in such a manner as to be able to be slidingly guided along the axial direction, the second cam body 52 is supported in a state of being slidingly movable along the axial direction and being non-rotatable in the cylinder portion 72h of the base side hinge case 72.

In addition, each second cam body 52 is contained in a state of being biased in the axial direction to the side where the corresponding table side hinge case 71 is located by the coil spring 53 and having the cam surface 55 thereof placed opposite to the cam surface 54 of the paired first cam body 51 in such a way as to face each other in the axial direction. In other words, each second cam body 52 is in a state of being relatively rotatable and slidingly movable in the axial direction with respect to the paired first cam body 51 on the side where the table side hinge case 71 is located.

Figure 2B:
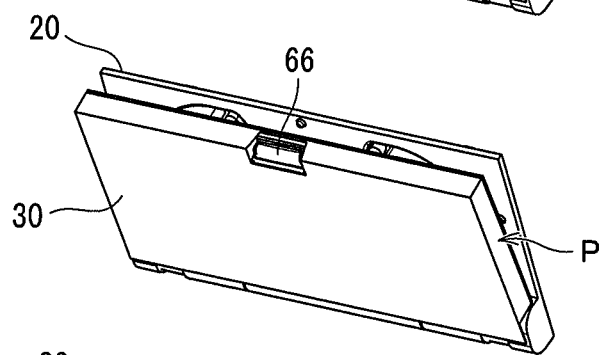
Figure 2C:
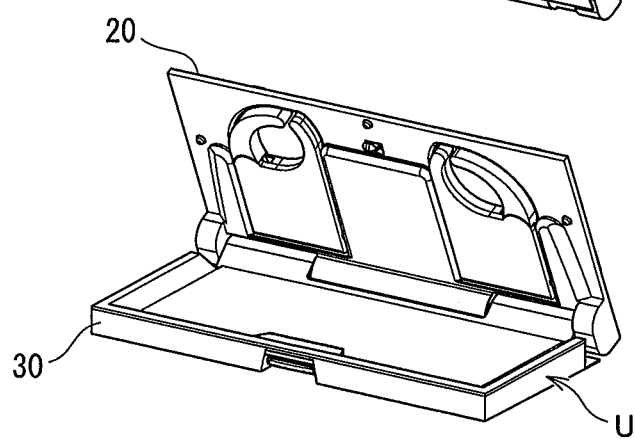
Figure 2D:
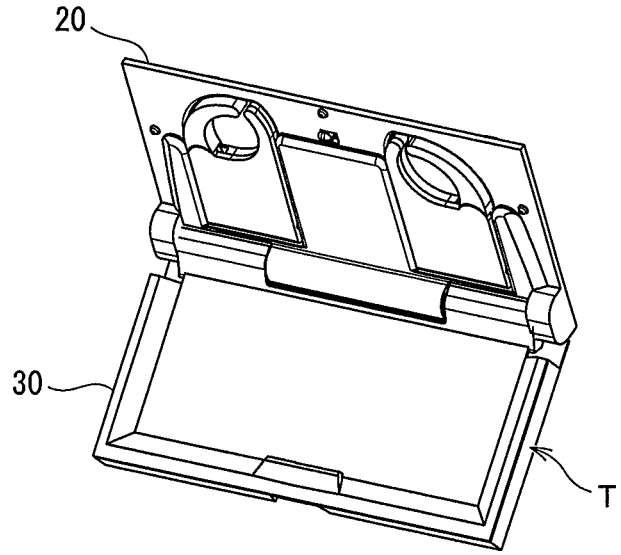

Each first cam body 51 and the paired second cam body 52 are configured to enable the table main body 30 to be retained in and released from a partially-housed attitude P, the use attitude U, and a spread-out attitude T, illustrated in FIGS. 2B to 2D, by means of a camming action in which the concavo-convex shapes formed on the cam surfaces 54 and 55 of the respective cam bodies engage and disengage with and from each other in the direction in which the cam surfaces 54 and 55 face each other.

Figure 6A:
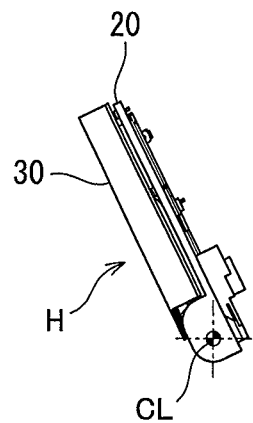
FIGS. 6A to 6C are diagrams descriptive of the hinge mechanism in the housed attitude illustrated in FIG. 2A, and FIGS. 6A to 6C are a side view of the table unit, a front view of a portion of the hinge mechanism including a pair of cam bodies, and an enlarged view of a portion of cam surfaces of the respective cam bodies in FIG. 6B, respectively (hereinafter, the same applies to FIGS. 7A to 7C, 8A to 8C, and 9A to 9C)
Figure 6B:
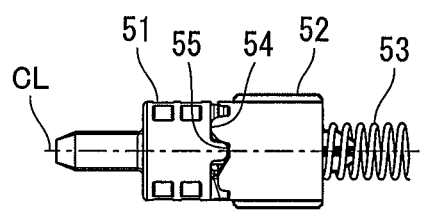
Figure 6C:
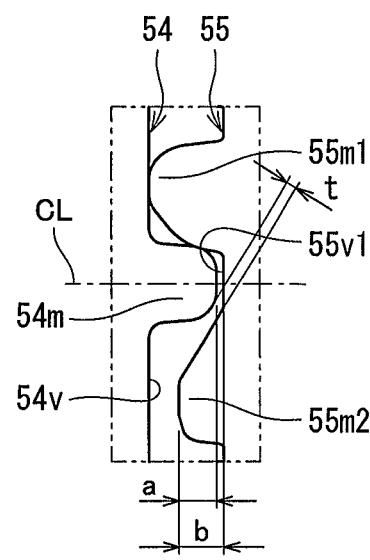

Specifically, as illustrated in FIGS. 6A to 6C, when the table main body 30 is in the housed attitude H (FIG. 6A), the cam surfaces 54 and 55 of each pair of the respective cam bodies 51 and 52 are configured to fit to each other at a position at which each mountain portion 54m formed on the cam surface 54 of the first cam body 51 faces a valley portion $55v_1$ between a first mountain portion $55m_1$ and a second mountain portion $55m_2$ among the in total six mountain portions $55m_1$ and $55m_2$ formed on the cam surface 55 of the second cam body 52, as illustrated in an enlarged manner in FIG. 6C.

When the cam surfaces 54 and 55 are in this state, a clearance t that serves as a free running portion from the housed attitude H is provided between surface portions of the respective cam surfaces 54 and 55 that face each other in the circumferential direction corresponding to rotation of the table main body 30 (FIG. 6C).

In the present embodiment, a first mountain portion $55m_1$ has a height (axial distance) higher than a second mountain portion $55m_2$ and an end face of a first mountain portion $55m_1$ coming into contact with a valley portion $54v$ facing the first mountain portion $55m_1$ causes respective positions in the axial direction of each pair the cam bodies 51 and 52 to be restricted. On this occasion, when it is assumed that an engagement dimension between a second mountain portion $55m_2$ and a mountain portion $54m$ of the first cam body 51 and height of a second mountain portion $55m_2$ are denoted by a and b, respectively, the engagement dimension and the height are set as a=2.5 mm and b=3 mm, respectively, in the present embodiment. The first mountain portions $55m_1$ and the second mountain portions $55m_2$ are alternately arranged at equal intervals in the circumferential direction.

Figure 7A:
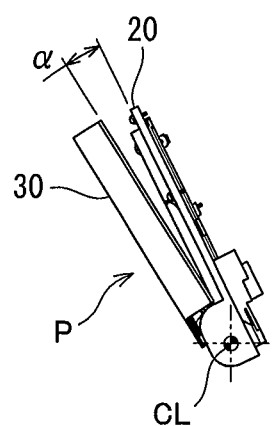
FIGS. 7A to 7C are diagrams descriptive of the hinge mechanism in the partially-housed attitude illustrated in FIG. 2B.
Figure 7B:
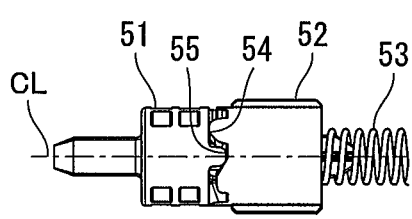
Figure 7C:
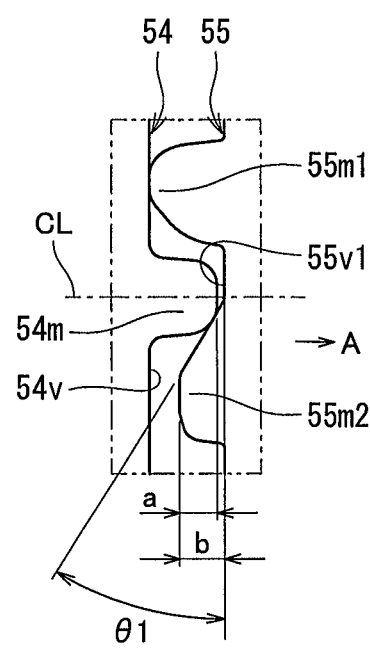

Each pair of the cam bodies 51 and 52 is configured in such a way that, when the restriction by the hook unit 60 described above is removed while the table main body 30 is in the housed attitude H, the table main body 30 inclines by the self-weight thereof as illustrated in FIGS. 7A to 7C and the cam bodies 51 and 52 relatively move to each other by a free running distance corresponding to the clearance t described above. This movement enables the table main body 30 to rotate to the partially-housed attitude P in FIG. 7A. Further, the respective cam surfaces 54 and 55 of each pair of the cam bodies 51 and 52 are configured to, at the position of the partially-housed attitude P, engage with each other as illustrated in FIG. 7C and thereby retain the table main body 30 in the partially-housed attitude P. On this occasion, when it is assumed that an opening angle by which the table main body 30 rotates to the partially-housed attitude P is denoted by α, the clearance t is set in such a way that the opening angle α becomes 6° in the present embodiment.

In the hinge mechanism 50 of the present embodiment, within the respective cam surfaces 54 and 55 of each pair of the cam bodies 51 and 52, a cam surface portion corresponding to an angular interval along which the table main body 30 rotates from the partially-housed attitude P to the use attitude U is set to be an incline the degree of inclination angle θ1 of which is gentler than degrees of inclination of the other portions of the respective cam surfaces 54 and 55 of the pair of the cam bodies 51 and 52. In the present embodiment, an inclination angle θ1 of the cam surface portion of each second mountain portion $55m_2$ is set at 32°. In the present embodiment, this configuration causes light operability to be achieved in an operation in which a passenger manually rotates the table main body 30 from the partially-housed attitude P to the use attitude U.

Figure 8A:
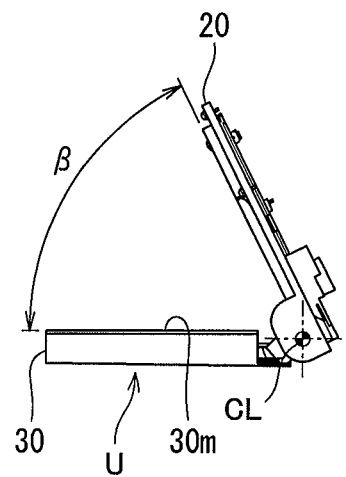
FIGS. 8A to 8C are diagrams descriptive of the hinge mechanism in the use attitude illustrated in FIG. 2C.
Figure 8B:
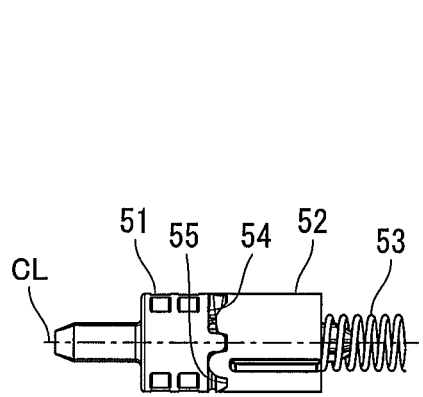
Figure 8C:
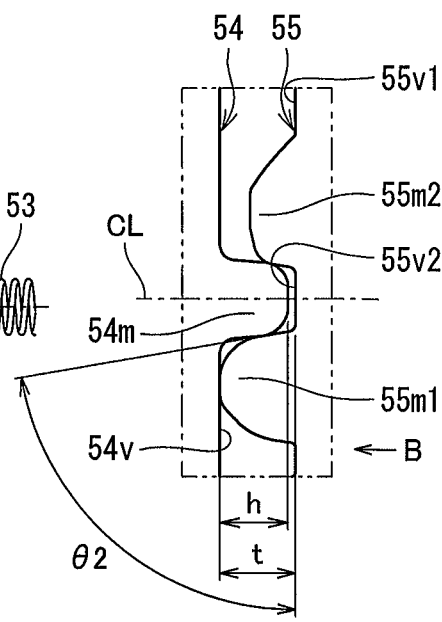

When the table main body 30 is rotated from the partially-housed attitude P illustrated in FIG. 7A to the use attitude U illustrated in FIG. 8A, each first cam body 51 and the paired second cam body 52 rotate to positions illustrated in FIGS. 8B and 8C by means of a camming action in which the concavo-convex shapes formed on the cam surfaces 54 and 55 of the respective cam bodies engage and disengage with and from each other in the direction in which the cam surfaces 54 and 55 face each other. That is, each mountain portion 54m of each first cam body 51 is configured to relatively climb over a second mountain portion $55m_2$ of the paired second cam body 52 and move to a position at which the mountain portion 54m faces a valley portion $55v_2$ between the second mountain portion $55m_2$ and a succeeding first mountain portion $55m_1$.

When the cam surfaces 54 and 55 are in this state, no clearance is provided between a side surface in the circumferential direction of each mountain portion 54m of the first cam body 51 and a preceding second mountain portion $55m_2$ and between another side surface of the mountain portion

54m and a succeeding first mountain portion $55m_1$ and both side surfaces are in a contact state with the second mountain portion $55m_2$ and the first mountain portion $55m_1$. This configuration causes the table main body 30 to be retained in the use attitude U, in which the table mounting-surface 30m becomes substantially horizontal, without backlash. In the present embodiment, the shapes of the respective cam surfaces 54 and 55 of each pair of the cam bodies 51 and 52 are set in such a way that an opening angle β by which the table main body 30 rotates from the housed attitude H to the use attitude U becomes 63.5°.

In the use attitude U, when it is assumed that, as illustrated in FIG. 8C, an engagement dimension between a first mountain portion $55m_1$ and a mountain portion 54m of each first cam body 51 and height of a first mountain portion $55m_1$ are denoted by h and t, respectively, the engagement dimension and the height are set as h=4.5 mm and t=5 mm, respectively, in the present embodiment. Further, an inclination angle θ2 of the cam surface of a first mountain portion $55m_1$ is set at 80°. This configuration enables the table main body 30 to bear a mounting load as high as a level necessary and sufficient for regular use when the table main body 30 is positioned in the use attitude U.

Figure 9A:
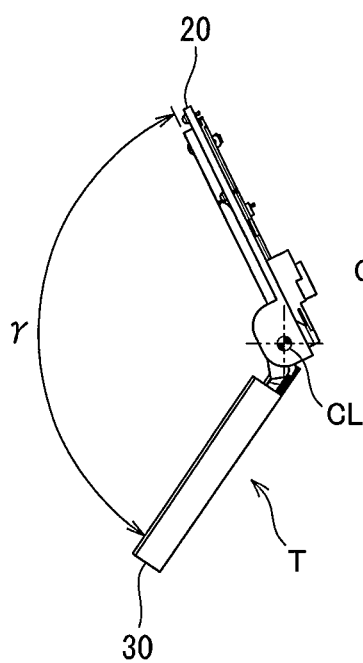
FIGS. 9A to 9C are diagrams descriptive of the hinge mechanism in the spread-out attitude illustrated in FIG. 2D.

Furthermore, the hinge mechanism 50 has the respective cam surfaces 54 and 55 of each pair of the cam bodies 51 and 52 formed in such a way as to, when the table main body 30 receives a mounting load exceeding a predetermined limit while the table main body 30 is in the use attitude U described above, rotate the table main body 30 to the spread-out attitude T, in which the table main body 30 is opened to a further lower side than the use attitude U, as illustrated in FIG. 9A.

Figure 3A:
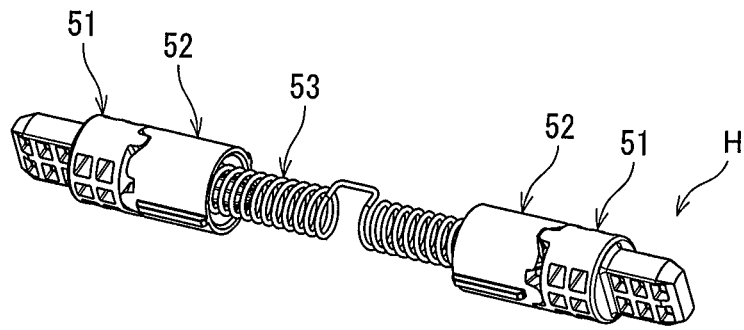
FIGS. 3A to 3D are perspective views descriptive of rotational positions of cam bodies corresponding to the respective plurality of attitudes that the table main body may take in the hinge mechanism illustrated in FIG. 1B, and FIGS. 3A to 3D illustrate states of the cam bodies in the housed attitude, the partially-housed attitude, the use attitude, and the spread-out attitude, respectively.
Figure 3B:
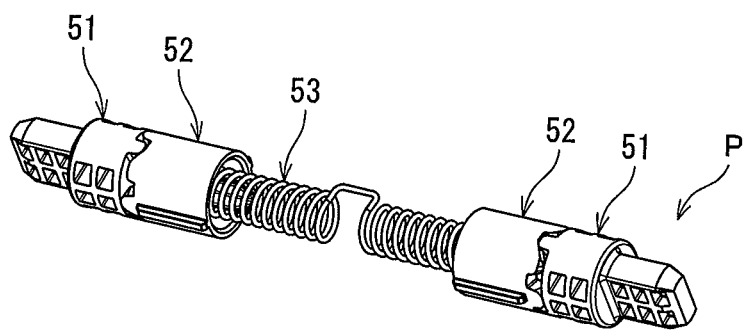
Figure 3C:
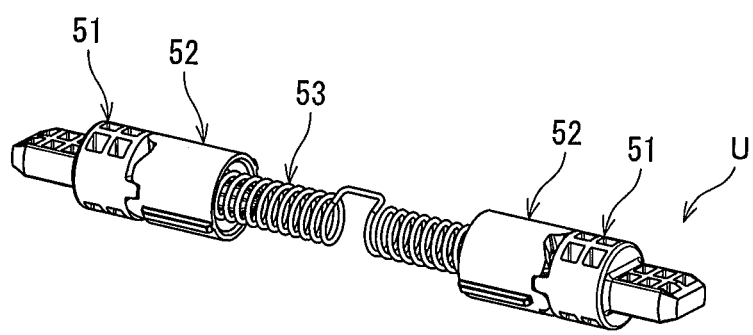
Figure 3D:
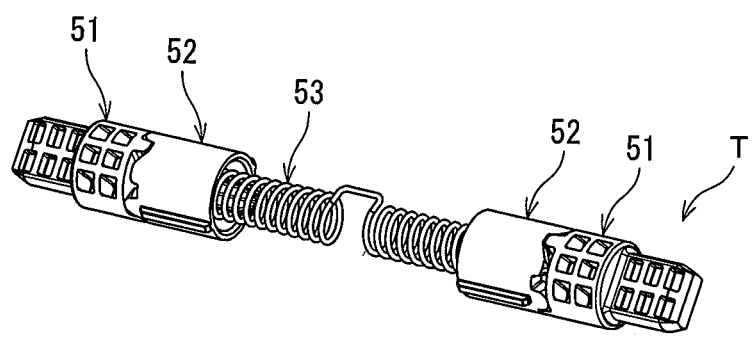
Figure 9B:
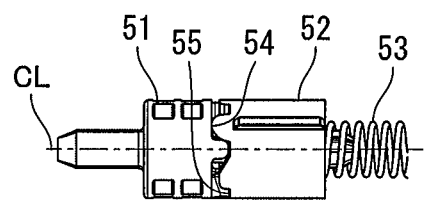
Figure 9C:
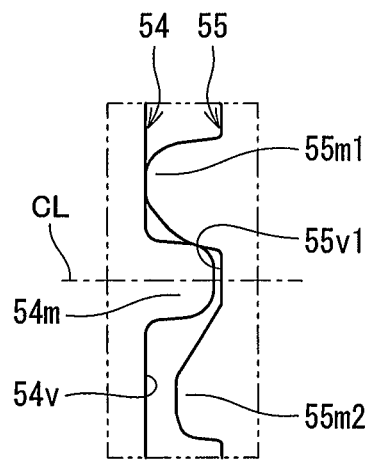

That is, when the table main body 30 receives a mounting load exceeding a predetermined limit, the pairs of the cam bodies 51 and 52 are brought to a state illustrated in FIG. 3D. At this time, as illustrated in FIGS. 9B and 9C, each mountain portion 54m of each first cam body 51 is configured to be able to relatively climb over a first mountain portion $55m_1$ of the paired second cam body 52 and move to a position at which the mountain portion 54m faces a valley portion $55v_1$ between the first mountain portion $55m_1$ and a succeeding second mountain portion $55m_2$. This movement enables the table main body 30 to rotate to the spread-out attitude T, in which the table main body 30 is opened to a further lower position. In the present embodiment, the shapes of the respective cam surfaces 54 and 55 of each pair of the cam bodies 51 and 52 are set in such a way that an opening angle γ by which the table main body 30 rotates from the housed attitude H to the spread-out attitude T becomes 119.5°.

Next, operation and operational effects of the table unit 10 described above will be described.

Since the table unit 10 of the present embodiment includes the hook unit 60, which performs retention of an attitude of the table main body 30 in the housed attitude H and release of the table main body 30 from the housed attitude H, and, in the fulcrum shaft portion of the table main body 30, the hinge mechanism 50, which includes pairs of the cam bodies 51 and 52 that face each other in a state of being biased in the axial direction, opening operation of the table main body 30 can be easily performed.

That is, the table main body 30 of the present embodiment is retained in the housed attitude H by the hook unit 60, which is a housed attitude retaining unit different from the hinge mechanism 50, and, when the retention by the hook unit 60 is released, the table main body 30 rotates to the partially-housed attitude P by the self-weight of the table main body 30. On this occasion, since the hinge mechanism 50 is configured to retain the table main body 30 in the partially-housed attitude P, which is located halfway from the housed attitude H to the use attitude U, the table main body 30 is retained in the state of the partially-housed attitude P. In the partially-housed attitude P, the table main body 30 is put in a state of, so to speak, half-open. Therefore, it is possible to prompt a passenger to perform manual opening or closing. Thus, it can be said that the table unit 10 enables opening operation of the table main body 30 to be easily performed.

In other words, the table unit 10 of the present embodiment is configured in such a way that, in opening and closing operation of the table main body 30, when the table main body 30 is in the housed attitude H illustrated in FIGS. 2A and 6A, the two pairs of the cam bodies 51 and 52 are in a state illustrated in FIG. 3A and, at this time, each mountain portion 54m constituting the cam surface 54 of each first cam body 51 and a first mountain portion $55m_1$ and a second mountain portion $55m_2$ constituting the cam surface 55 of the paired second cam body 52 are not completely engaged with each other and are in a state of being provided with a clearance t in the circumferential direction in such a way as to provide a free running portion in the circumferential direction, as illustrated in FIG. 6C.

Because of this configuration, when the passenger manually pushes the push button 66 of the hook unit 60 and thereby releases the hook main body 61 from engagement to the engagement hole 65, the table main body 30 starts to rotate backward by the self-weight thereof within an angular range corresponding to the free running portion and the two pairs of the cam bodies 51 and 52 are brought to a state illustrated in FIG. 3B, and, at this time, engagement of each first cam body 51 with the paired second cam body 52 causes the rotation of the table main body 30 to be stopped at the position of the partially-housed attitude P, the rotational position of which is restricted, as illustrated in FIG. 7C.

Thus, the table unit 10 of the present embodiment enables the passenger to, by, in the partially-housed attitude P, hooking his/her fingers on a peripheral portion or the like of the table main body 30 and rotating the table main body 30 backward from the backrest, smoothly rotate the table main body 30 to a position at which the table main body 30 becomes substantially horizontal and thereby bring the table main body 30 to the use attitude U illustrated in FIG. 2C. In addition, by rotating the table main body 30 forward from the use attitude U and thereby bringing the table main body 30 back to the housed attitude H in FIG. 2A again, the passenger can perform opening and closing operation easily.

In other words, when, from the partially-housed attitude P in FIGS. 2B and 7A, the passenger further rotates the table main body 30 manually in the opening direction against a biasing force F of the coil spring 53, each pair of the cam bodies 51 and 52 move in such a manner that, from the state illustrated in FIG. 7C, the second cam body 52, with respect to the first cam body 51, retracts in the direction indicated by the arrow A in FIG. 7C against the biasing force F of the coil spring 53 and the first cam body 51, relatively to the movement of the second cam body 52, rotates integrally with the table main body 30. When the table main body 30 has rotated by a predetermined angle β, the two pairs of the cam bodies 51 and 52 are brought to an engagement state illustrated in FIG. 3C. At this time, as illustrated in FIG. 8C, each second mountain portion $55m_2$ formed on the cam surface 55 of each second cam body 52 climbs over a mountain portion 54*m* formed on the cam surface 54 of the paired first cam body 51 and moves to the opposite side of the mountain portion 54*m*.

When the pairs of the cam bodies 51 and 52 are brought to this state, the biasing force F of the coil spring 53 pushing each second cam body 52 to the paired cam body 51 in the direction indicated by the arrow B in FIG. 8C causes the table main body 30 to automatically rotate to the use attitude U illustrated in FIGS. 2C and 8A. At this time, as illustrated in FIG. 8C, each first cam body 51 and the paired second cam body 52 are brought to a state in which each mountain portion 54*m* constituting the cam surface 54 of the first cam body 51 and a first mountain portion 55$m_1$ and a second mountain portion 55$m_2$ constituting the cam surface 55 of the second cam body 52 engage with each other in the circumferential direction without allowance and the U of the table main body 30 is thereby retained without backlash.

Further, when the table main body 30 is brought back from the state in which the use attitude U is retained to the housed attitude H again, the passenger manually rotates the table main body 30 from the state illustrated in FIGS. 2C and 8A in the closing direction against the biasing force of the coil spring 53. This operation enables the table main body 30 to rotate in the closing direction and transition to the housed attitude H through the same operation as the opening operation except that the rotational direction and the biasing direction are reversed.

As described thus far, according to the table unit 10 of the present embodiment, since the table unit 10 has, so to speak, a dual housed attitude retaining structure by incorporating the hinge mechanism 50, which is capable of retaining the table main body 30 in the partially-housed attitude P, and the hook unit 60, which is capable of retaining the housed attitude, separately from the hinge mechanism 50, it is possible to prevent or suppress table opening at the time of vehicle collision.

In addition, according to the table unit 10 of the present embodiment, cooperation between the cam bodies facing each other in the hinge mechanism 50 in the fulcrum shaft portion enables fixing force required for the hook unit 60 in the housed attitude H to be reduced. Since this capability enables opening force required for positioning the table main body 30 to the use attitude U, in which the table main body 30 is leveled, to be set lower, opening operation of the table main body 30 can be easily performed.

According to the table unit 10 of the present embodiment, since only a passenger's rotating the table main body 30 manually in the opening direction or the closing direction by a predetermined angle causes the table main body 30 to subsequently rotate automatically by a biasing force of the coil spring 53 that the hinge mechanism 50 includes and through a camming action between each pair of the cam bodies 51 and 52, it is possible to easily perform opening and closing operation of the table main body 30. In addition, the state of the use attitude U, in which the table main body 30 is opened, can be retained automatically without backlash by a biasing force of the coil spring 53 and through a camming action between each pair of the cam bodies 51 and 52.

According to the table unit 10 of the present embodiment, since the hinge mechanism 50 includes, as a pair of the cam bodies 51 and 52, the first cam body 51 and the second cam body 52 that are disposed along the axis CL1 on the base side and the axis CL2 on the table main body side, respectively, coaxially with the fulcrum axis CL and have the cam surfaces 54 and 55, respectively, on which concavo-convex portions that can engage and disengage with and from each other in the direction in which the cam surfaces 54 and 55 face each other are formed along the circumferential direction and the first cam body 51 and the second cam body 52 are capable of retaining and releasing the table main body 30 in and from each of the partially-housed attitude P and the use attitude U through cooperation between the cam surfaces 54 and 55 of the respective cam bodies, it is possible to retain the respective attitudes of the table main body 30 by use of such a compact configuration based on cooperation between the cam surfaces 54 and 55, which are disposed coaxially with the fulcrum axis CL.

In particular, according to the table unit 10 of the present embodiment, when the table main body 30 is in the housed attitude H, the cam surfaces 54 and 55 of each pair of the cam bodies 51 and 52 have a clearance t that serves as a free running portion from the housed attitude H between surface portions of the cam surfaces 54 and 55 that face each other in the circumferential direction according to rotation of the table main body 30, and, when retention by the hook unit 60 is released, by the table main body 30 inclining by the self-weight thereof and the pair of the cam bodies 51 and 52 relatively moving by a free running distance corresponding to the clearance t, the table main body 30 rotates to the partially-housed attitude P by the self-weight thereof and, therewith, the respective cam surfaces 54 and 55 of each pair of the cam bodies 51 and 52 engage with each other at the position of the partially-housed attitude P and are able to retain the table main body 30 in the partially-housed attitude P. Thus, the table unit 10 excels in achieving a structure that facilitates opening and closing operation of the table main body 30 with a compact configuration.

According to the table unit 10 of the present embodiment, since, in the hinge mechanism 50, a cam surface portion corresponding to an angular interval along which the table main body 30 rotates from the partially-housed attitude P to the use attitude U within the respective cam surfaces 54 and 55 of each pair of the cam bodies 51 and 52 is set to be an incline the degree of inclination of which is gentler than degrees of inclination of the other portions of the respective cam surfaces 54 and 55 of the pair of the cam bodies 51 and 52, operational force required for an operation to rotate the table main body 30 from the partially-housed attitude P to the use attitude U and a reverse operation thereof can be lowered. Thus, the table unit 10 excels in facilitating opening and closing operation of the table main body 30.

According to the table unit 10 of the present embodiment, since the hinge mechanism 50 has the respective cam surfaces 54 and 55 of each pair of the cam bodies 51 and 52 formed in such away as to, when the table main body 30 receives a mounting load exceeding a predetermined limit while the table main body 30 is in the use attitude U, rotate the table main body 30 to the spread-out attitude T, in which the table main body 30 is rotated to the further lower side than the use attitude U, it is possible to prevent the structures, including the hinge mechanism 50 and the like, from being damaged even when the table main body 30 receives a mounting load exceeding the predetermined limit while the table main body 30 is in the use attitude U.

In addition, according to the table unit 10 of the present embodiment, since the push button 66, which is an operation portion of the hook unit 60, is disposed at a position on an upper portion of the table main body 30 in the housed attitude H, the table unit 10 excels in visual recognizability and operability for passengers.

The table unit according to the present invention is not limited to the above embodiment and various modifications are possible without departing from the spirit and scope of the present invention.

For example, although, in the embodiment described above, an example of applying, as a table unit according to the present invention, a table unit to the rear surface of the backrest of a seat for a vehicle was described, the table unit according to the present invention may be, without being limited to the example, applied to a seat for a transportation means mounted on a transportation means other than a vehicle, such as a ship, a train, and an airplane.

Although, for example, in the embodiment described above, an example in which, when a release operation of engagement of the hook unit 60 is performed, the table main body 30 rotates to the partially-housed attitude P by the self-weight thereof and, therewith, the respective cam surfaces 54 and 55 of each pair of the cam bodies 51 and 52 engage with each other at the position of the partially-housed attitude P and retain the table main body 30 in the partially-housed attitude P was described, the present invention is not limited to the example.

For example, the respective cam surfaces 54 and 55 of each pair of the respective cam bodies 51 and 52 may be configured in such a way as to, when the table main body 30 is in the housed attitude H, bias the table main body 30 toward the side where the partially-housed attitude P is positioned from the position of the housed attitude H by a biasing force produced by the cam surfaces 54 and 55 of the pair of the cam bodies 51 and 52 coming into contact with each other.

When such a configuration is employed, the biasing force, produced by the respective cam surfaces 54 and 55 of each pair of the cam bodies 51 and 52 coming into contact with each other, enables the table main body 30 to be forcibly rotated from the housed attitude H to the partially-housed attitude P. Therefore, such a configuration is suitable for making the table main body 30 rotate without fail.

REFERENCE SIGNS LIST

10 Table unit
20 Base panel
21 Front surface
24 Center cover
30 Table main body
30*m* Table mounting-surface
31 Front side panel
32 Rear side panel
33 Bulging portion
34 Opening portion
40L, 40R Cup holder
50 Hinge mechanism
51 First cam body
51*d* Mounting hole
51*h* Main body portion
51*r* Connection portion
52 Second cam body
52*d* Bottom surface
52*f* Support shaft
52*h* Main body portion
52*j* Shaft portion
52*k* Opening portion
52*s* Spline
53 Coil spring (biasing means)
53*k* Hooking portion
53*s* Spring portion
54 Cam surface (of a first cam body)
54*m* Mountain portion
54*v* Valley portion
55 Cam surface (of a second cam body)
55*m* Mountain portion
55*v* Valley portion
60 Hook unit (housed attitude retaining unit)
61 Hook main body
61*t* Claw
62 Fulcrum shaft
65 Engagement hole
66 Push button
66*p* Hook pushing-down protruding portion
70 Hinge case
71 Table side hinge case
71*h* Insertion hole
72 Base side hinge case
72*h* Cylinder portion
72*k* Opening portion
72*m* Inner peripheral surface
72*w* Middle wall surface
73 Hinge case cover
CL Fulcrum axis
F Biasing force
H Housed attitude
P Partially-housed attitude
T Spread-out attitude
U Use attitude

The invention claimed is:

1. A table unit comprising:
a base panel disposed to a back surface of a backrest of a seat;
a table main body mounted to the base panel via a fulcrum shaft portion and configured to be able to rotate toward a back side of the backrest from a housed attitude in which a table mounting-surface of the table main body is positioned along the base panel to a use attitude in which the table mounting-surface is distanced from the base panel;
a housed attitude retaining unit configured to retain and release the table main body in and from the housed attitude; and
a hinge mechanism configured to, disposed separately from the housed attitude retaining unit, form the fulcrum shaft portion and to be able to retain and release the table main body in and from a plurality of attitudes,
wherein the hinge mechanism is configured to be able to retain the table main body in, as the plurality of attitudes of the table main body, the use attitude and a partially-housed attitude located on the way from the housed attitude to the use attitude,
wherein the hinge mechanism includes a pair of cam bodies arranged facing each other in a state of being biased in an axial direction of the fulcrum shaft portion, the cam bodies respectively having cam surfaces, the pair of cam bodies including a first cam body and a second cam body disposed on a base panel side and a table main body side, respectively, of the fulcrum shaft portion and respectively having the cam surfaces on which concavo-convex portions capable of engaging and disengaging with and from each other in a direction in which the first cam body and the second cam body face each other are formed along a circumferential direction, and the first cam body and the second cam body are configured to be able to retain and release the table main body in and from each of the partially-housed attitude and the use attitude through cooperation between the cam surfaces of the first cam body and the second cam body,
wherein the respective cam surfaces of the pair of cam bodies are configured in such a way that, when the table main body is in the housed attitude, the cam surfaces have a clearance serving as a free running portion from the housed attitude between surface portions of the respective cam surfaces that face each other in a circumferential direction corresponding to rotation of the table main body, and, when retention by the housed attitude retaining unit is released, by the table main body inclining by a self-weight of the table main body and the pair of cam bodies relatively moving by a free running distance corresponding to the clearance, the table main body rotates to the partially-housed attitude and the respective cam surfaces of the pair of cam bodies engage with each other at a position of the partially-housed attitude and retain the table main body.

2. The table unit according to claim 1, wherein
in the hinge mechanism, within the respective cam surfaces of the pair of cam bodies, a cam surface portion corresponding to an angular interval along which the table main body rotates from the partially-housed attitude to the use attitude is set to be an incline the degree of inclination of which is gentler than degrees of inclination of other portions of the respective cam surfaces of the pair of cam bodies.

3. The table unit according to claim 1, wherein
the hinge mechanism is configured to, when the table main body receives a mounting load exceeding a predetermined limit while the table main body is in the use attitude, rotate the table main body to a spread-out attitude in which the table main body is rotated to a further lower side than the use attitude.

4. The table unit according to claim 1, wherein
an operation portion of the housed attitude retaining means is disposed at a position on an upper portion of the table main body in the housed attitude.

5. A table unit comprising:
a base panel disposed to a back surface of a backrest of a seat;
a table main body mounted to the base panel via a fulcrum shaft portion and configured to be able to rotate toward a back side of the backrest from a housed attitude in which a table mounting-surface of the table main body is positioned along the base panel to a use attitude in which the table mounting-surface is distanced from the base panel;
a housed attitude retaining unit configured to retain and release the table main body in and from the housed attitude; and
a hinge mechanism configured to, disposed separately from the housed attitude retaining unit, form the fulcrum shaft portion and to be able to retain and release the table main body in and from a plurality of attitudes,
wherein the hinge mechanism is configured to be able to retain the table main body in, as the plurality of attitudes of the table main body, the use attitude and a partially-housed attitude located on the way from the housed attitude to the use attitude,
wherein the hinge mechanism includes a pair of cam bodies arranged facing each other in a state of being biased in an axial direction of the fulcrum shaft portion, the cam bodies respectively having cam surfaces, the pair of cam bodies including a first cam body and a second cam body disposed on a base panel side and a table main body side, respectively, of the fulcrum shaft portion and respectively having the cam surfaces on which concavo-convex portions capable of engaging and disengaging with and from each other in a direction in which the first cam body and the second cam body face each other are formed along a circumferential direction, and the first cam body and the second cam body are configured to be able to retain and release the table main body in and from each of the partially-housed attitude and the use attitude through cooperation between the cam surfaces of the first cam body and the second cam body,
wherein the hinge mechanism is configured to, when the table main body is in the housed attitude, bias the table main body toward the partially-housed attitude side from a position of the housed attitude by a biasing force produced by the respective cam surfaces of the pair of cam bodies coming into contact with each other.

6. The table unit according to claim 5, wherein
in the hinge mechanism, within the respective cam surfaces of the pair of cam bodies, a cam surface portion corresponding to an angular interval along which the table main body rotates from the partially-housed attitude to the use attitude is set to be an incline the degree of inclination of which is gentler than degrees of inclination of other portions of the respective cam surfaces of the pair of cam bodies.

7. The table unit according to claim 5, wherein
the hinge mechanism is configured to, when the table main body receives a mounting load exceeding a predetermined limit while the table main body is in the use attitude, rotate the table main body to a spread-out attitude in which the table main body is rotated to a further lower side than the use attitude.

8. The table unit according to claim 5, wherein
an operation portion of the housed attitude retaining means is disposed at a position on an upper portion of the table main body in the housed attitude.

* * * * *